United States Patent [19]

Hanna

[11] 4,439,883

[45] Apr. 3, 1984

[54] VEHICLE WASHING APPARATUS

[76] Inventor: Daniel C. Hanna, 1133 SW. Rivington Dr., Portland, Oreg. 97201

[21] Appl. No.: 437,454

[22] Filed: Oct. 28, 1982

[51] Int. Cl.³ .............................................. B60S 3/04
[52] U.S. Cl. ................................. 15/97 B; 15/DIG. 2
[58] Field of Search ........................... 15/97 B, DIG. 2

[56] References Cited

U.S. PATENT DOCUMENTS

| | | | |
|---|---|---|---|
| 3,499,180 | 3/1970 | Hurwitz | 15/97 B |
| 3,711,883 | 1/1973 | Ennis | 15/97 B |
| 3,859,686 | 1/1975 | Breish | 15/97 B |
| 3,862,460 | 1/1975 | Rockafellow | 15/97 B |
| 3,914,818 | 10/1975 | Fromme | 15/97 B |
| 4,057,866 | 11/1977 | Belanger | 15/97 B |
| 4,096,600 | 6/1978 | Belanger | 15/97 B |
| 4,164,053 | 8/1979 | Shelstad | 15/97 B |
| 4,173,805 | 11/1979 | Silcock | 15/97 B |

Primary Examiner—Edward L. Roberts
Attorney, Agent, or Firm—Klarquist, Sparkman, Campbell, Leigh & Whinston

[57] ABSTRACT

The invention provides an apparatus for mounting downwardly depending vehicle washing mitters. It includes a frame suspended above a vehicle washing station, a horizontally disposed support for the mitters, the support being rotatably mounted to the frame about a vertical axis to permit rotational oscillation thereof, a suspension extending from the frame to the support, the suspension being radially offset from the axis, and an oscillator for oscillating the support means about the axis. Thus, the suspension causes the support to vertically oscillate as the support is being rotationally oscillated.

7 Claims, 5 Drawing Figures

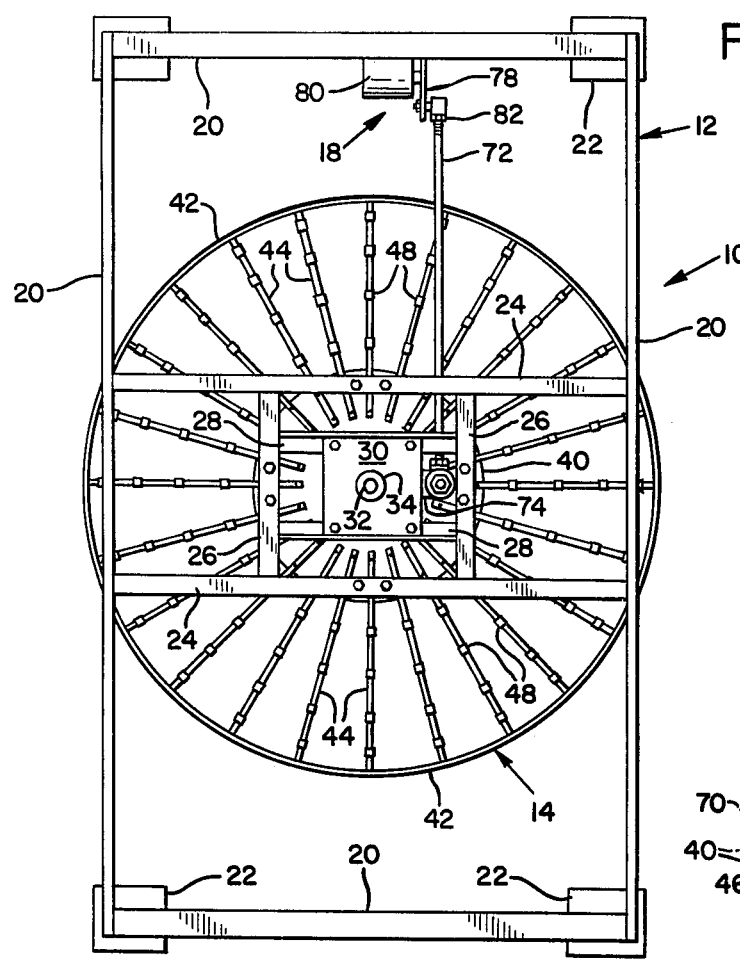
FIG. 2
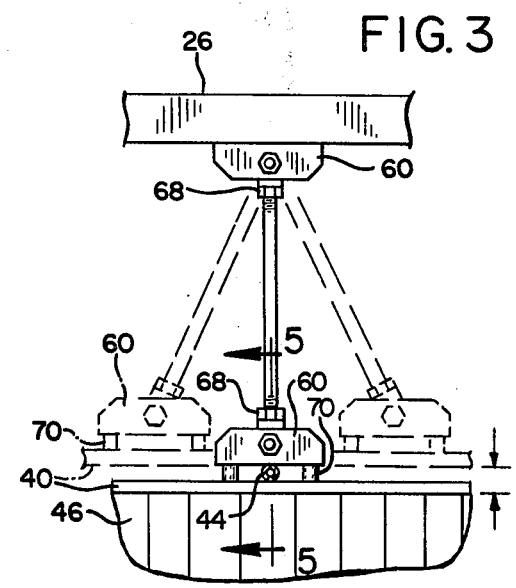
FIG. 3
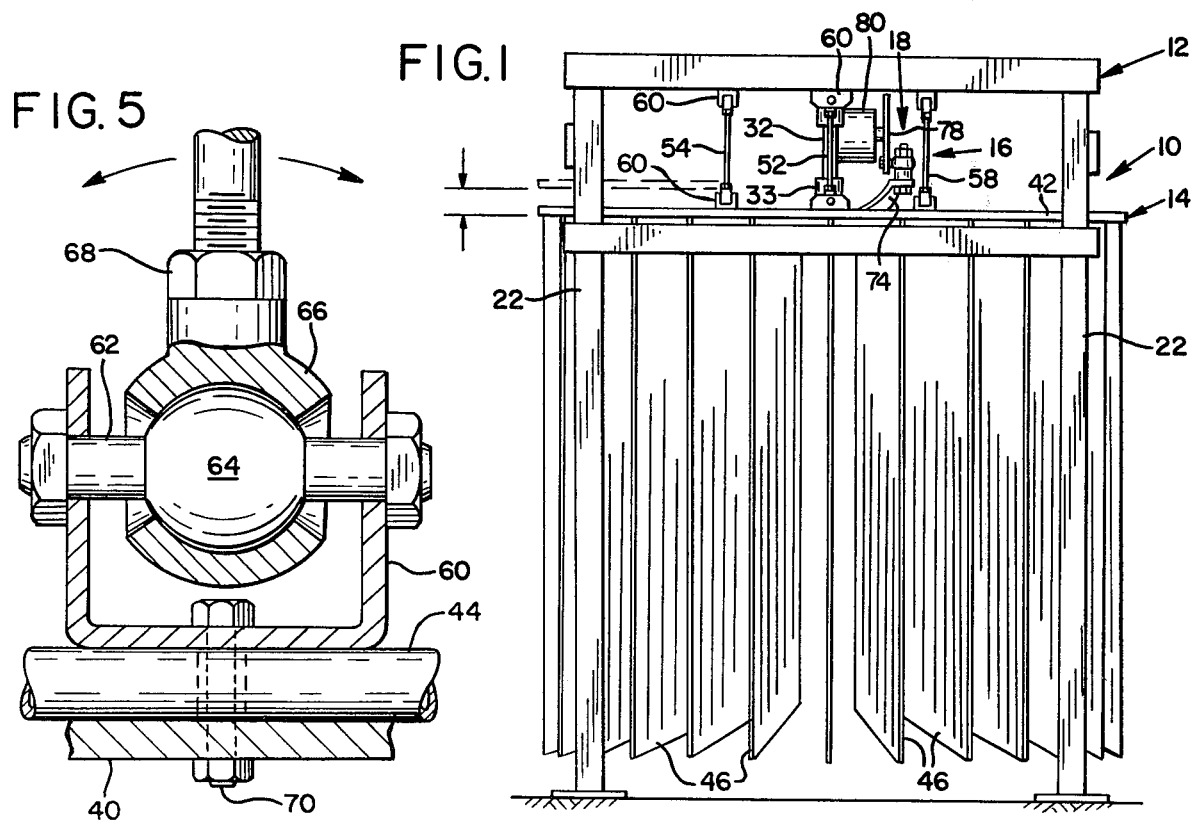
FIG. 5
FIG. 1

VEHICLE WASHING APPARATUS

BACKGROUND OF THE INVENTION

1. Field of the Invention

This invention relates generally to vehicle washing operations and more particularly to apparatus for mounting and operating downwardly depending vehicle washing means.

2. Discussion of the Prior Art

It has long been a goal of car wash engineers to design a single washing apparatus which is capable of washing a relatively large percentage of the vehicle surface. Conventional washing systems typically include either rotatable brushes or downwardly depending mitters. A mitter is a fabric panel which may be cut into multiple strips and depends downwardly from an elevated support structure. Washing mitters are often displaceable to effect relative movement between the mitter and the car, with the hope to cause the best possible cleaning. Several prior art designs use a pivotal support which reciprocates the mitters laterally or from side-to-side. As this lateral reciprocation is effected, a slight vertical oscillation also results. The following U.S. patents are exemplary of this type of movement: Ennis U.S. Pat. No. 3,711,883; Breish U.S. Pat. No. 3,859,686; Hurwitz U.S. Pat. No. 3,499,180; Belanger U.S. Pat. No. 4,096,600; and Silcock U.S. Pat. No. 4,173,805. The Ennis patent discloses an eccentric type drive mechanism to cause the reciprocation, while other, similar drive mechanisms are disclosed in the other patents.

Other prior art efforts have concentrated on the development of a washing mitter support which oscillates rotationally along a horizontal axis. U.S. Pat. to Shelstad, No. 4,164,053 and Rockafellow, No. 3,862,460 are exemplary of this type of apparatus.

While these prior efforts have been successful to a certain extent in increasing the amount of relative movement between the vehicle and the washing mitter, they exhibit several drawbacks. For example, most of the above patents disclose apparatus in which particular washing mitters contact the vehicle first, while other mitters brush against the vehicle subsequently. This causes vehicle dirt to be concentrated in those few mitters which make initial contact. It would clearly be preferable if others of the washing mitters contacted the vehicle first some of the time so that the dirt would be more evenly distributed, thus requiring less frequency cleaning and replacement of the mitters.

Another drawback with prior art designs is that only a relatively small part of the surface of each of the washing mitter actually contacts the car. This not only reduces the washing effect of the mitter but again tends to concentrate the dirt.

Yet another drawback with many prior art designs is that they are relatively complicated in design, thereby resulting in substantial initial and operating expense.

Hence, it is a primary object of the present invention to provide an improved vehicle washing apparatus which effectively and reliably overcomes the limitations and drawbacks of the prior art proposals. More specifically, it is an object of the present invention to provide an apparatus for mounting downwardly depending vehicle washing means which is simple in design yet which results in a relatively large percentage of the vehicle surface being washed. Another object is to provide means for mounting and operating a plurality of downwardly depending washing mitters in which the dirt from the vehicles will be evenly distributed among the mitters so that they may be used for a substantial period of time without replacement or cleaning. Yet another object of the present invention is to provide means for mounting and operating downwardly depending mitters in which the mitters are being reciprocated from side-to-side while simultaneously oscillating vertically. Still another object of the present invention is to provide a car washing apparatus which achieves the above objects while being relatively simple in design and therefore inexpensive to purchase, operate, and maintain.

SUMMARY OF THE INVENTION

This invention responds to the problems presented in the prior art by providing an apparatus for mounting downwardly depending vehicle washing means including (1) a frame suspended above a vehicle washing station; (2) horizontally disposed support means for supporting the vehicle washing means, the support means being rotatably mounted to the frame about a vertical axis to permit rotational oscillation thereof; (3) suspension means radially offset from the axis, the suspension means extending from the frame to the support means; and (4) means for rotatably oscillating the support means about the axis, whereby the suspension means causes the support means to vertically oscillate as the support means is being rotationally oscillated.

The invention thus provides an apparatus which is relatively simple in design, yet which provides dramatically improved car washing capability.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view of a first embodiment of the present invention as it would appear stationary, partially showing in phantom the position of the mitter support in its raised position;

FIG. 2 is a plan view of the embodiment of FIG. 1;

FIG. 3 is a fragmentary schematic view of the embodiment of FIG. 1 showing one of the pivot arms in an initial and rotationally pivoted position, illustrating in phantom how the mitter support becomes elevated when the pivot arms are displaced;

FIG. 5 is a sectional view taken along line 5—5 of FIG. 3, showing the mounting means of each of the pivot arms.

DETAILED DESCRIPTION OF THE PREFERRED EMBODIMENT

Structure of the Depicted Embodiment

Figure 4:
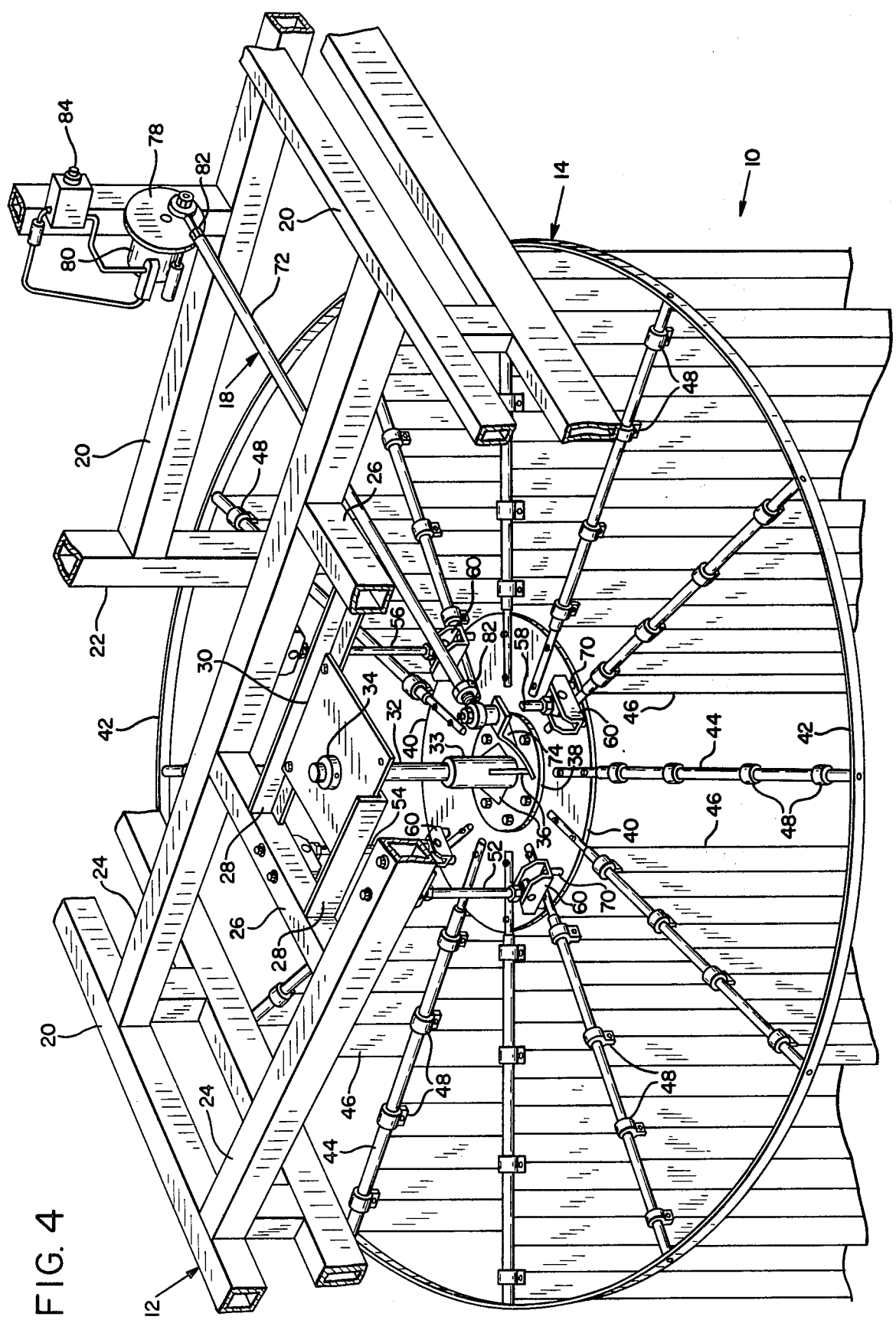
FIG. 4 is a partially cutaway perspective view of the embodiment of FIG. 1.

The principles of this invention are particularly useful when embodied in a mitter oscillator such as that illustrated in FIGS. 1 through 5, generally identified with numeral 10. The mitter oscillator 10 is comprised essentially of a frame 12, a horizontally extending mitter support means 14, a suspension means 16 interconnecting the mitter support means with the frame, and an oscillation means 18 for rotatably oscillating the mitter support means 14.

Frame 12 consists of four peripheral frame members 20 which are supported at the corners by four vertically extending support columns 22. A pair of transverse frame members 24 extend between two of the peripheral frame members 20, with a pair of longitudinal frame members 26 extending between transverse frame members 24. Transverse angle members 28 extend between longitudinal frame members 26. A shaft support plate 30 is fastened to each of the transverse angle members 28, and a shaft 32 is fixed thereto by a collar 34, only the upper half of which shows in the figures.

Mitter support means 14 includes a sleeve 33 which encompasses and is slidably mounted to the lower end of shaft 32. Sleeve 33 is welded with gussets 36 to a support means mounting plate 38, which is bolted to a mitter support plate 40. A mitter support ring 42 is also provided, with a plurality of radially extending mitter support arms 44 reaching between it and mitter support plate 40. Washing mitters 46 hang downwardly from mitter support arms 44 and are mounted thereto by appropriate clamps 48 or other mounting means.

The weight of mitter support means 14 and mitters 46 is supported from frame 12 by suspension means 16. In the depicted embodiment, suspension means 16 comprises four pivot arms 52, 54, 56, and 58. Pivot arms 52 and 56 extend from transverse frame members 24 to mitter support plate 40, while pivot arms 54 and 58 extend between longitudinal frame members 26 and mitter support plate 40. Each of the pivot arms are mounted to mitter support plate 40 and transverse or longitudinal frame members 24 or 26 by channel-like pivot arm mounting members 60.

As seen best in the enlarged cross-sectional view of a pivot arm mounting member 60 in FIG. 5, each of the mounting members includes a cross pin 62 with a generally spherical central portion 64. A pivot arm mounting ring 66 engages each of the cross pins 62 and has a configuration which complements that of the spherical central portion 64 thereof. This design permits each of the pivot arms 52, 54, 56, and 58 to slightly shift angularly with respect to cross pins 62, which is a necessary feature because angular displacement occurs as mitter support plate 40 is rotationally oscillated. Each of the pivot arm mounting members 60 is mounted to mitter support plate 40 or transverse or longitudinal frame members 24 or 26 by a pair of pins 70, as shown best in FIGS. 4 and 5.

Pivot arms 52, 54, 56, and 58 are threaded adjacent their ends to accommodate for linear adjustment using adjustment nuts 68. Such adjustment should not be necessary very often, and certainly no variation of the length of the pivot arms takes place during operation of the mitter oscillator 10. For this reason, pivot arms 52, 54, 56, and 58 will sometimes be described herein as being of "fixed length."

Oscillation means 18 includes an oscillation arm 72 which is mounted to a web 74. Web 74 is fixed to support means mounting plate 38 at a point offset from shaft 32 so that reciprocation of oscillation arm 72 causes support means mounting plate 38 to rotationally oscillate. The means by which oscillation arm 72 is mounted to web 74 is not shown in detail but is similar to the design depicted in FIG. 5, with a cross pin having a substantially spherical central portion to accommodate for the slight vertical displacement of oscillation arm 72 as it is being driven.

A similar mounting is included at the opposite end of oscillation arm 72 where it is eccentrically mounted to a drive plate 78. Drive plate 78 is driven by a drive motor 80. Thus, rotation of drive plate 78 causes oscillation arm 72 to reciprocate, which in turn causes mitter support plate 40 and the rest of mitter support means 14 and mitters 46 to rotationally oscillate.

The ends of oscillation arm 72 are threaded and include adjustment nuts 82 to permit the effective length thereof to be adjusted as necessary. An on/off switch 84 is shown in FIG. 4 to be adjacent drive motor 80, but this switch would normally be in a position which is more easily accessible to an operator.

Operation of the Depicted Embodiment

The rotation of drive plate 78, to which oscillation arm 72 is eccentrically mounted, causes support means mounting plate 38 and mitter support plate 40 to rotationally oscillate by approximately 40 to 55 degrees. While shaft 32 is fixed to provide a stationary axis of rotational oscillation, sleeve 33 mounted to it is permitted to rotate first in one direction, then the other.

FIGS. 1 and 4 depict mitter support plate 40, pivot arms 52, 54, 56 and 58 and the other structure of mitter oscillator 10 in a starting, nonrotationally displaced position. When oscillation arm 72 rotationally displaces mitter support plate 40, pivot arms 52, 54, 56 and 58 take an angularly disposed position such as that depicted in phantom in FIG. 3. Because the length of each of the pivot arms is fixed during this oscillation, angular displacement of the pivot arms causes mitter support plate 40 and the entire mitter support means 14 to be elevated to the position depicted in phantom in FIGS. 1 and 3. Relative vertical movement between mitter support means 14 and frame 12 is possible because sleeve 33 is free to slide upwardly and downwardly along shaft 32.

The rotational and vertical oscillation of the downwardly depending mitters 46 causes an extremely effective washing action to be imparted to the vehicle being washed. The rotational side-to-side oscillation of the mitters causes different ones of the mitters to initially contact the vehicle, so that the vehicle dirt is more evenly distributed among the mitters than is present with many existing designs. This side-to-side oscillation also causes both sides of each of the mitters to contact the vehicle. The simultaneous vertical oscillation of mitters 46 results in a more effective washing of the vehicle because of the greater amount of relative movement between the vehicle and the mitters. This vertical oscillation also results in the mitters bouncing up and down which tends to cause the mitters to contact the vehicle in a more random fashion than would otherwise occur. This not only prevents streaking of dirt on the vehicle but again ensures that a relatively high percentage of the vehicle surface will be contacted by the mitters.

It can thus be seen that the design of mitter oscillator 10 is simple yet provides a dramatically improved cleaning capability.

Of course, it should be understood that various changes and modifications of the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An apparatus for mounting downwardly depending vehicle washing means, comprising:

an elevated frame;

horizontally disposed support means for supporting the vehicle washing means, said support means being rotatably mounted to said frame about a vertical axis to permit rotational oscillation thereof;

fixed length suspension means radially offset from said axis and extending from said frame to said support means; and means for rotatably oscillating said support means about said axis, whereby said suspension means causes said support means to vertically oscillate as said support means is being rotationally oscillated.

2. The apparatus of claim 1 wherein said suspension means comprises a plurality of pivot arms.

3. The apparatus of claim 1 wherein said oscillation means comprises a reciprocating arm mounted to said support means radially offset from said axis, and a rotating eccentric mounted to said frame, said eccentric being drivingly connected to said reciprocating arm.

4. The invention of claim 1 further comprising downwardly depending vehicle washing means mounted to said support means.

5. The apparatus of claim 4 wherein said support means includes a plurality of radially extending mitter support arms and said washing means includes a plurality of washing mitters depending downwardly from said mitter support arms.

6. The apparatus of claim 1 wherein said frame includes a vertical shaft corresponding to said axis, and said support means is slidably mounted to said shaft to permit said support means to oscillate rotatably and vertically with respect to said frame.

7. A vehicle washing apparatus comprising:

an elevated frame including a downwardly extending shaft defining an axis;

a plurality of mitters;

horizontally disposed mitter support means slidably mounted to said shaft to permit rotational oscillation thereof about said axis, said mitter support means including a plurality of radially extending mitter support arms to which said mitters are mounted and from which said mitters downwardly depend;

a plurality of radially opposed pivot arms extending from said frame to said mitter support means; and an eccentric-driven oscillation arm mounted to said mitter support means offset from said axis, whereby reciprocation of said oscillation arm causes simultaneous rotational and vertical oscillation of said mitter support means.

* * * * *